J. M. SEARS.
AUTOMOBILE ATTACHMENT.
APPLICATION FILED MAY 25, 1920.

1,389,847.

Patented Sept. 6, 1921.

Inventor
J. M. Sears.

Witness

By C.A.Snow & Co.
Attorneys

UNITED STATES PATENT OFFICE.

JOSEPH M. SEARS, OF LOCKHART, TEXAS.

AUTOMOBILE ATTACHMENT.

1,389,847.  Specification of Letters Patent.  Patented Sept. 6, 1921.

Application filed May 25, 1920. Serial No. 384,062.

*To all whom it may concern:*

Be it known that I, JOSEPH M. SEARS, a citizen of the United States, residing at Lockhart, in the county of Caldwell and State of Texas, have invented a new and useful Automobile Attachment, of which the following is a specification.

This invention has reference to automobile attachments, and it is the object of the invention to provide novel means adapted to be attached to the floor board of an automobile for closing the clutch pedal openings of the floor, thus preventing the heat of the motor from passing upwardly into the body of the automobile.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
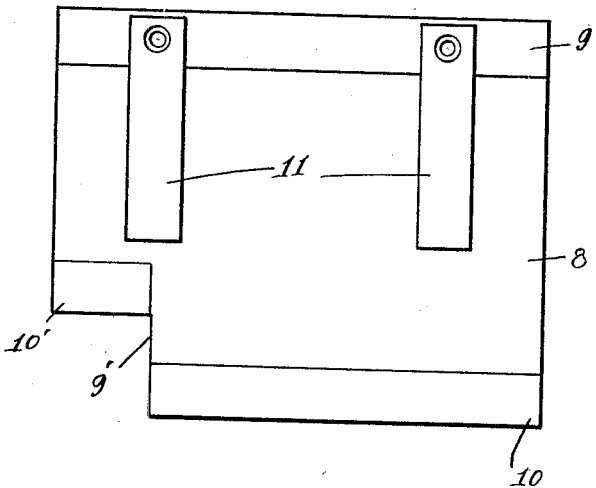
Figure 1 illustrates a plan view of the attachment.
Figure 2:
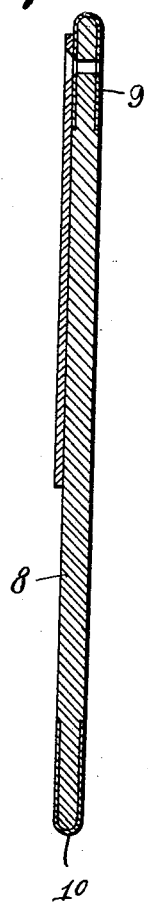
Fig. 2 illustrates a sectional view taken on line 2—2 of Fig. 1.
Figure 3:
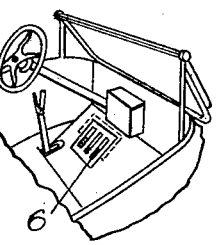
Fig. 3 illustrates a fragmental view of an automobile showing the attachment in dotted lines as applied.

Referring to the drawing in detail, the reference character 5 designates the usual floor board of an automobile, which is provided with the usual clutch pedal openings 6, in which operate the clutch pedals 7.

The attachment includes a body portion 8 formed of asbestos, or other suitable flexible fibrous material, which body portion is provided with the metallic protecting members 9 and 10, bent intermediate their side edges so that the same may be clamped over the edges of the body portion 8, and held against displacement.

As shown, one corner of the body portion 8 is cut away as at 9', to provide a clearance for the brake pedal, which is relatively wider than the remaining clutch pedals, and one edge of this cut out portion is protected by the metallic member 10', to contact with the brake pedal to prevent wear of the body 8.

Figure 4:
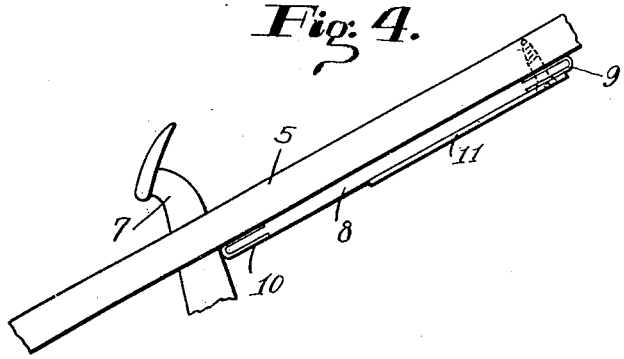
Fig. 4 illustrates a side elevational view of a floor board showing the attachment applied thereto.

Connected to the body portion 8, are the spaced spring members 11, each of which being provided with an opening disposed adjacent to one end thereof, which openings are adapted to receive the securing screws 12, by means of which the attachment is secured to the floor board 5, as shown more particularly by Fig. 4 of the drawing.

In the operation of the device, the body portion is attached to the underside of the floor board 5 so that the protecting plate 10 will contact with the clutch pedals, so that movement of the clutch pedals will result in a relative movement of the attachment to move the same out of engagement with the floor board.

It follows that when the clutch pedals are released, the spring members 11 will return the attachment to its normal position to close the clutch pedal openings and cause the heat from the motor to be directed from the body of the automobile.

Having thus described the invention, what is claimed is:—

1. In combination with the floor board of an automobile having clutch pedal openings formed therein, a protecting member formed of flexible material, protecting strips secured to the front and rear edges of the protecting member, and means secured to the protecting member for normally urging the same into engagement with the floor board to close the clutch pedal openings.

2. In combination with the floor board of an automobile having clutch pedal openings formed therein, a protecting member including a body portion, said body portion having metallic protecting plates embracing the longitudinal edges thereof, said body portion adapted to normally close the clutch pedal openings, and spring members for urging the protecting member into engagement with the floor board.

In testimony that I claim the foregoing as my own, I have hereto affixed my signature in the presence of two witnesses.

JOSEPH M. SEARS.

Witnesses:
BOYCE ELLISON,
TYRE H. BROWN.